United States Patent
Kazy et al.

(10) Patent No.: US 10,291,293 B2
(45) Date of Patent: May 14, 2019

(54) ELECTRONIC DEVICE AND WIRELESS CHARGING METHOD OF ELECTRONIC DEVICE

(71) Applicant: Samsung Electronics Co., Ltd., Suwon-si, Gyeonggi-do (KR)

(72) Inventors: Fayeen Shariar Kazy, Dhaka (BD); Muhammad Mahbubur Rahman, Comilla (BD); Sadik Noman, Dhaka (BD)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/075,866

(22) Filed: Mar. 21, 2016

(65) Prior Publication Data

US 2016/0285517 A1 Sep. 29, 2016

(30) Foreign Application Priority Data

Mar. 27, 2015 (KR) ........................ 10-2015-0042951

(51) Int. Cl.
| | |
|---|---|
| *H04B 5/00* | (2006.01) |
| *H02J 50/90* | (2016.01) |
| *H02J 50/12* | (2016.01) |
| *H02J 50/23* | (2016.01) |
| *H02J 50/00* | (2016.01) |
| *H04B 7/06* | (2006.01) |
| *H02J 50/80* | (2016.01) |

(52) U.S. Cl.
CPC ............ *H04B 5/0037* (2013.01); *H02J 50/90* (2016.02); *H02J 50/00* (2016.02); *H02J 50/12* (2016.02); *H02J 50/23* (2016.02); *H02J 50/80* (2016.02); *H04B 7/0617* (2013.01)

(58) Field of Classification Search
CPC .. H02J 17/00; H02J 50/00; H02J 50/15; H02J 50/20; H02J 50/23; H02J 50/12; H04B 5/0037; H04B 7/0617
USPC ......................... 455/567, 573, 63.4; 320/108
See application file for complete search history.

(56) References Cited

U.S. PATENT DOCUMENTS

| | | | | |
|---|---|---|---|---|
| 6,633,026 B2 * | 10/2003 | Tuominen | ............... | H02J 17/00 250/205 |
| 8,692,505 B2 * | 4/2014 | Chu | ........................ | H02J 17/00 320/101 |
| 9,106,203 B2 * | 8/2015 | Kesler | ...................... | H02J 17/00 |
| 9,438,063 B2 * | 9/2016 | Lin | ............................ | H02J 7/34 |
| 2010/0079011 A1 * | 4/2010 | Hyde | ...................... | H02J 17/00 307/149 |

(Continued)

FOREIGN PATENT DOCUMENTS

| | | | | | |
|---|---|---|---|---|---|
| JP | 9-252334 | * | 9/1997 | .............. | H04M 1/00 |
| JP | 2001-189776 | * | 7/2001 | .............. | H04M 1/00 |

*Primary Examiner* — Ankur Jain
(74) *Attorney, Agent, or Firm* — Jefferson IP Law, LLP

(57) ABSTRACT

An electronic device is provided. The electronic device includes a communication unit configured to transmit and receive data to and from an external device, a power transmitter configured to wirelessly supply power to the external device, and a controller configured to, when a wireless charging request is received from the external device, identify a location of the external device, determine a direction in which electromagnetic energy is output according to the location of the external device, and control the power transmitter to output the electromagnetic energy in the determined direction to wirelessly supply power to the external device.

21 Claims, 16 Drawing Sheets

(56) References Cited

U.S. PATENT DOCUMENTS

| | | | | |
|---|---|---|---|---|
| 2011/0270462 A1* | 11/2011 | Annan | .................... | H02J 5/005 700/297 |
| 2012/0007441 A1* | 1/2012 | John | .................... | A61N 1/3785 307/104 |
| 2012/0029750 A1* | 2/2012 | Ortnnann | ............ | B60L 11/1818 701/22 |
| 2012/0052923 A1* | 3/2012 | Park | ........................ | H02J 7/025 455/567 |
| 2012/0184338 A1* | 7/2012 | Kesler | ..................... | H02J 17/00 455/572 |
| 2012/0214462 A1* | 8/2012 | Chu | ...................... | H04M 19/04 455/418 |
| 2012/0235499 A1* | 9/2012 | Liu | ........................ | H02J 17/00 307/104 |
| 2012/0235504 A1* | 9/2012 | Kesler | ..................... | H03H 7/40 307/104 |
| 2012/0295634 A1* | 11/2012 | Kim | ........................ | H02J 7/025 455/456.1 |
| 2013/0252676 A1* | 9/2013 | Lee | ....................... | H04B 5/0037 455/573 |
| 2013/0307468 A1* | 11/2013 | Lee | ....................... | H02J 7/0052 320/108 |
| 2014/0103871 A1* | 4/2014 | Maikawa | ................ | H02J 7/025 320/108 |
| 2014/0145515 A1* | 5/2014 | Jung | ....................... | H02J 17/00 307/104 |
| 2014/0217955 A1* | 8/2014 | Lin | .......................... | H02J 7/34 320/101 |
| 2015/0340875 A1* | 11/2015 | Prasad | .................. | G06F 1/3203 307/104 |
| 2016/0099755 A1* | 4/2016 | Leabman | ............. | H04B 5/0037 307/104 |
| 2016/0141882 A1* | 5/2016 | Ichikawa | ............... | H02J 17/00 307/104 |

* cited by examiner

ELECTRONIC DEVICE AND WIRELESS CHARGING METHOD OF ELECTRONIC DEVICE

CROSS-REFERENCE TO RELATED APPLICATION(S)

This application claims the benefit under 35 U.S.C. §119(a) of a Korean patent application filed on Mar. 27, 2015 in the Korean Intellectual Property Office and assigned Serial No. 10-2015-0042951, the entire disclosure of which is hereby incorporated by reference.

TECHNICAL FIELD

The present disclosure relates to an electronic device capable of performing effective and safe wireless charging and a wireless charging method of an electronic device.

BACKGROUND

Recently, in order to provide a wireless charging function to an electronic device such as a smart phone, a tablet personal computer (PC), and the like, there is much research being conducted and developments being made. Accordingly, many electronic devices, which are currently released or are due to be released, are starting to support the wireless charging function of an electromagnetic induction scheme, a resonance scheme, or the like.

Wireless charging methods may be largely divided into the electromagnetic induction scheme and the resonance scheme. The electromagnetic induction scheme has a problem of a limited distance in spite of a small power loss. The resonance scheme has a relatively high power loss rate but has an advantage of a greater distance and charging a plurality of electronic devices. The resonance scheme corresponds to a method of maximizing a wireless transmission efficiency of energy through resonance between antennas of a power supply device and a power reception device. To this end, the power supply device synchronizes a resonant frequency with the power reception device to generate a resonant channel and transmits wireless power through the resonant channel.

However, wireless charging has a problem in that, when there is a hindrance in a path through which power is transmitted or a charging distance is far, a charging efficiency is significantly reduced. Further, in the wireless charging, a user may be exposed to electromagnetic waves for the wireless charging and thus affected by the electromagnetic waves.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device, which provides a wireless charging function having directivity, detects a hindrance that disturbs the charging, and reflects a state of the charging to support efficient and safe wireless charging, and a wireless charging method of the electronic device.

In accordance with an aspect of the present disclosure, an electronic device is provided. The electronic device includes a communication unit configured to transmit and receive data to and from an external device, a power transmitter configured to wirelessly supply power to the external device, and a controller configured to, when a wireless charging request is received from the external device, identify a location of the external device, determine a direction in which electromagnetic energy is output according to the location of the external device, controlling the power transmitter to output the electromagnetic energy in the determined direction and wirelessly supply the electromagnetic energy to the external device.

In accordance with an aspect of the present disclosure, a method of performing wireless charging by an electronic device is provided. The method includes receiving a wireless charging request from an external device, identifying a location of the external device, determining a direction in which electromagnetic energy is output according to the identified location of the external device, and outputting the electromagnetic energy in the determined direction to wirelessly supply power to the external device.

An electronic device and a wireless charging method of the electronic device according to various embodiments of the present disclosure can provide a wireless charging function having particular directivity.

An electronic device and a wireless charging method of the electronic device according to various embodiments of the present disclosure can support wireless charging having directivity to provide a more efficient and safer wireless charging function.

An electronic device and a wireless charging method of the electronic device according to various embodiments of the present disclosure can detect a hindrance existing between a device that supplies power and a device that receives power in wireless charging.

An electronic device and a wireless charging method of the electronic device according to various embodiments of the present disclosure can control a charging function according to whether a user uses a device and provide a safe wireless charging function.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
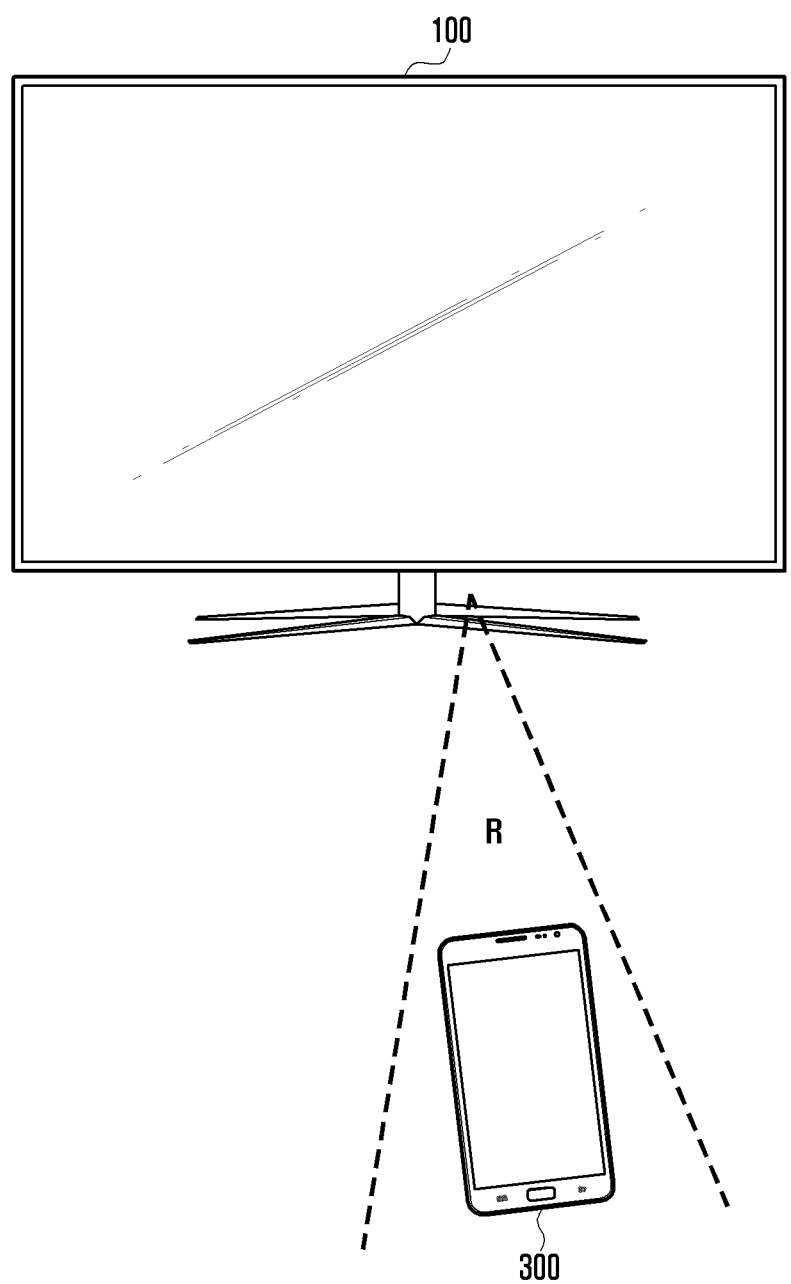
FIG. 1 illustrates a wireless charging system according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the accompanying drawings, some components may be exaggerated, omitted, or schematically illustrated, and a size of each component may not precisely reflect the actual size thereof. Thus, the present disclosure is not limited by the relative size or space drawn in the accompanying drawings.

Further, the singular form used in the present disclosure is intended to include the plural form unless clearly indicated in the context. Further, the term "and" used in the present specification should be understood as including any and all combinations of one or more of the associated listed items.

Further, the term "unit", "module", etc. used in the present disclosure implies a unit for performing at least one function or operation, which can be implemented by hardware, software, or a combination of hardware and software.

An electronic device (e.g., a source device or a receiver device) according to various embodiments of the present disclosure may have at least one of a broadcast reception function and a communication function. For example, the electronic device may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), an Moving Picture Experts Group phase 1 or phase 2 (MPEG-1 or MPEG-2) audio layer 3 (MP3) player, a mobile medical device, a camera, a wearable device (for example, a head-mounted-device (HMD) such as electronic glasses, electronic clothes, an electronic bracelet, an electronic necklace, an electronic accessory, an electronic tattoo, and a smart watch. According to various embodiments, the electronic device may be a smart home appliance that has at least one of a broadcast reception function and a communication function. The smart home appliances may include at least one of, for example, televisions, digital versatile disc (DVD) players, audio players, refrigerators, air conditioners, cleaners, ovens, microwaves, washing machines, air purifiers, set-top boxes, television (TV) boxes (e.g., HomeSync™ of Samsung, Apple TV™, or Google TV™), game consoles, electronic dictionaries, electronic keys, camcorders, or electronic frames.

According to various embodiments of the present disclosure, the electronic device may include at least one of various medical appliances (e.g. magnetic resonance angiography (MRA), magnetic resonance imaging (MRI), computed tomography (CT) machine, and an ultrasonic machine), navigation devices, global positioning system (GPS) receivers, event data recorders (EDRs), flight data recorders (FDRs), automotive infotainment devices, electronic equipment for ships (e.g. navigation equipment for ships, gyrocompasses, or the like), avionics, security devices, head units for vehicles, industrial or home robots, automatic teller machines (ATM) of banking facilities, and point of sales (POSs) of shops.

According to various embodiments of the present disclosure, the electronic device may include at least one of furniture or a part of a building/structure, an electronic board, an electronic signature receiving device, a projector, and various types of measuring devices (for example, a water meter, an electric meter, a gas meter, a radio wave meter and the like) including a camera function. An electronic device according to various embodiments of the present disclosure may be a combination of one or more of above described various devices. Also, an electronic device according to various embodiments of the present disclosure may be a flexible device. Also, an electronic device according to various embodiments of the present disclosure is not limited to the above described devices.

Hereinafter, the present disclosure will be described with reference to the accompanying drawings.

FIG. 1 illustrates a wireless charging system according to various embodiments of the present disclosure.

According to various embodiments of the present disclosure, a directional secured wireless charging system (DSWCS) that supports directional near field magnetic resonant (DNFMR) charging supporting a wireless charging function having directivity may be provided.

Referring to FIG. 1, the wireless charging system according to an embodiment may include an electronic device (for example, a source device) 100 for wirelessly supplying power and at least one electronic device (for example, receiver device) 300 for receiving power. FIG. 1 illustrates a smart TV as an example of the source device 100 and a smart phone as an example of the receiver device 300, but the present disclosure is not limited thereto. For example, the receiver device 300 may be a peripheral device such as a keyboard, a mouse, or the like.

The source device 100 may use a wireless charging method, through which power can be supplied to at least one receiver device 300 spaced apart by a predetermined distance, such as an electromagnetic resonance scheme using resonance or a microwave radiation scheme of converting electrical energy into a microwave and transmitting the microwave.

The receiver device 300 may wirelessly receive power from the source device 100. The receiver device 300 may charge a battery by using the power received from the source device 100.

The source device 100 and the receiver device 300 may be connected to each other through a resonance induction coupling. For example, the source device 100 and the receiver device 300 may be coupled to each other through an electromagnetic field.

The source device 100 and the receiver device 300 may transmit/receive data to/from each other. For example, the receiver device 300 may make a request for wireless charging to the source device 100. The source device 100 may transmit an authentication request to the receiver device 300 for identifying whether the receiver device 300 is a device that supports wireless charging. The receiver device 300 may transmit an authentication response to the source device 100. The source device 100 and the receiver device 300 may include a communication protocol (for example, Wi-Fi, Bluetooth, or the like) for transmitting/receiving data to/from each other.

The source device 100 may wirelessly supply power to the receiver device 300, of which the authentication has been completed. That is, the source device 100 may charge the receiver device 300 through the wireless charging method. According to an embodiment of the present disclosure, the source device 100 may detect a location of the receiver device 300. The source device 100 may determine a direction in which electromagnetic energy is output according to the location of the receiver device 300. For example, the source device 100 may output electromagnetic energy to a predetermined area R in a direction of the receiver device 300. The receiver device 300 may acquire power to charge the battery by converting the energy received from the source device 100.

Figure 2:
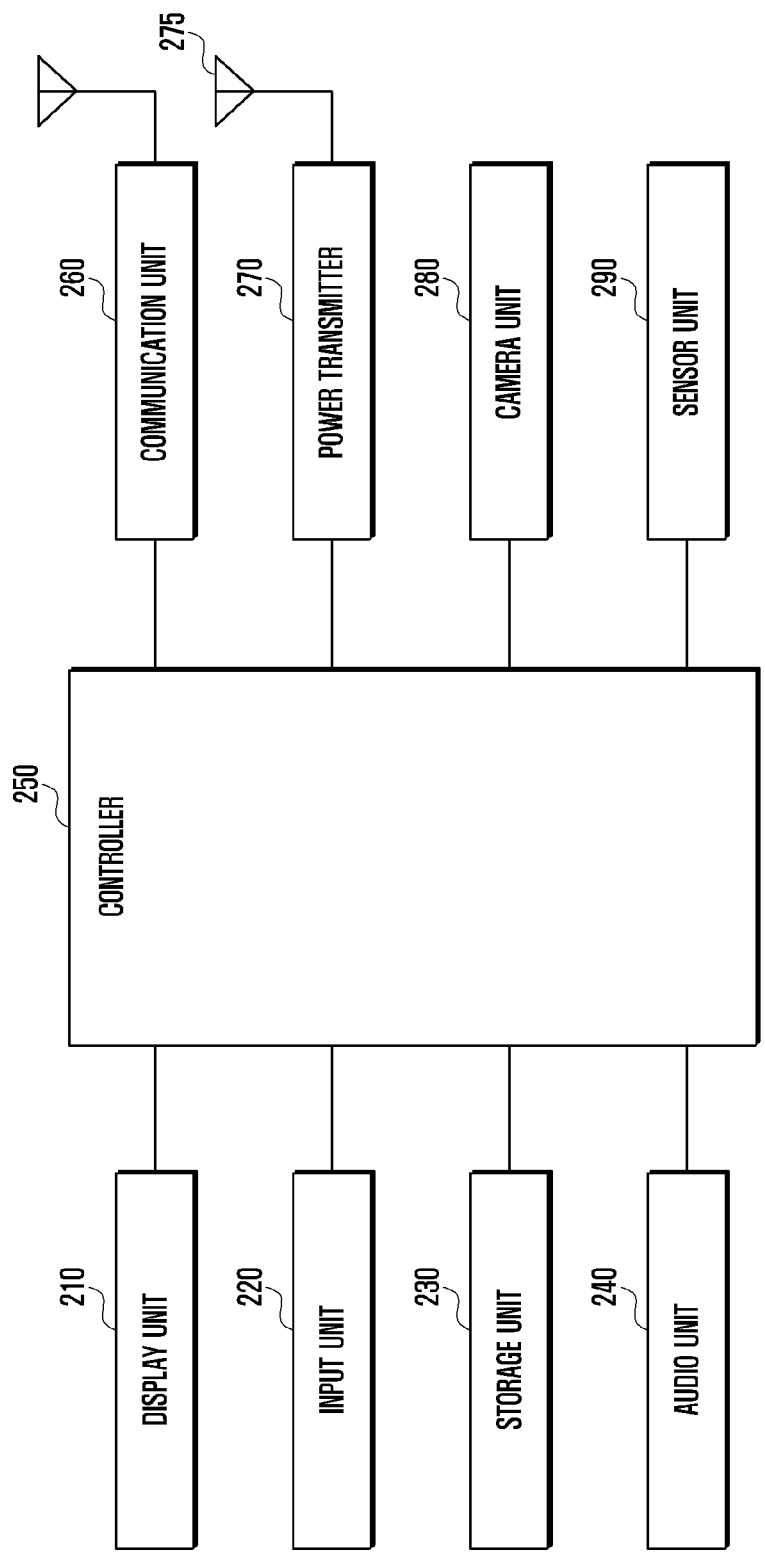
FIG. 2 is a block diagram of an electronic device according to various embodiments of the present disclosure.

FIG. 2 is a block diagram of an electronic device according to various embodiments of the present disclosure.

Referring to FIG. 2, the source device 100 may include a display unit 210, an input unit 220, a storage unit 230, an audio unit 240, a controller 250, a communication unit 260, a power transmitter 270, a camera unit 280, and a sensor unit 290.

The display unit 210 may display various pieces of data under a control of the controller 250. The display unit 210 may include a display panel or a hologram. The display panel may be, for example, a liquid crystal display (LCD), an Active matrix organic light emitting diode (AM-OLED), or the like. The display panel may be implemented to be, for example, flexible, transparent, or wearable. The hologram may show a three-dimensional image in the air using interference of light. According to an embodiment, the display unit 210 may be an external device separated from the source device 100. For example, the display unit 210 and the source device 100 may correspond to a TV and a set-top box, respectively, and may be connected to each other through an interface (for example, a high definition multimedia interface (HDMI)). According to an embodiment of the present disclosure, when the controller 250 detects a hindrance during the wireless charging, the display unit 210 may output a message warning against the hindrance.

The input unit 220 may receive a user input and transfer the user input to the controller 250. According to an embodiment of the present disclosure, the input unit 220 may be a separate external input device (for example, a keyboard, a mouse, a remote control, or the like).

The storage unit 230 may include a volatile memory and/or a non-volatile memory. The storage unit 230 may store data (for example, data generated through a microphone or a camera) generated by the source device 100 or data received from the external device 300 through the communication unit 260. The storage unit 230 may store a command or data for supporting wireless charging. The storage unit 230 may store an operating system (OS) of the source device 100. The storage unit 230 may store various execution programs (for example, applications or the like) of the source device 100.

The audio unit 240 may convert an electrical signal into a voice signal or a voice signal into an electrical signal. The audio unit 240 may include a microphone or a speaker. The microphone may convert a sound wave (user input) into an audio signal and transfer the audio signal to the controller 250. The speaker may convert the audio signal received from the controller 250 into a sound wave and output the sound wave. According to an embodiment of the present disclosure, when the controller 250 detects a hindrance during the wireless charging, the audio unit 240 may output a sound warning corresponding to the hindrance.

The controller 250 may control a plurality of hardware or software elements connected to the processor 210 by running an OS or an application program, and may process various types of data and arithmetic operations.

According to an embodiment of the present disclosure, when a wireless charging request is received from the external device 300, the controller 250 may determine a location of the external device 300. For example, the controller 250 may determine the location of the external device 300 by using information included in the wireless charging request received from the external device 300. The controller 250 may transmit a particular signal to the external device 300 through the communication unit 260 and receive a response to the particular signal, so as to determine the location of the external device 300.

The controller 250 may determine a direction in which electromagnetic energy is output according to the location of the receiver device 300. For example, the controller 250 may control the electronic device 100 to output electromagnetic energy to an area having a predetermined range in a direction of the external device 300. The area may be an area for outputting a micro wave to generate electromagnetic energy (for example, an electromagnetic field) in order to wirelessly charge the external device 300. For example, the controller 250 may control the electronic device 100 to selectively output the electromagnetic energy only in a particular direction For example, the controller 250 may control the electronic device 100 to selectively output the electromagnetic energy only in a particular direction of the external device.

According to an embodiment of the present disclosure, the controller 250 may pause the wireless charging when a call connection notification is received from the external device 300. For example, when the wireless charging is performed, an electromagnetic wave according to transmitted power is generated around the electronic device 100 and the external device 300. When a user of the external device 300 makes a phone call during the wireless charging, there is an influence by the electromagnetic wave around the user's head. Further, during the phone call, the user may feel inconvenienced or the device may be damaged due to the heat generated during a charging operation. The controller 250 may address the above problems by pausing the wireless charging while the external device 300 is used for the phone call. When a call termination notification is received from the external device 300, the controller 250 may reinitiate the wireless charging, which has been paused.

The controller 250 may monitor a charging amount of the external device 300. For example, the controller 250 may periodically receive information on the charging amount of the external device 300 from the external device 300. The controller 250 may compare the charging amount of the external device 300 with a reference value, which may be preset. For example, the reference value may be a particular charging power or voltage value. The reference value may be a particular charging change amount. The reference value may be a particular ratio value of the charging amount of the external device 300 to a transmitted power amount. For example, the controller 250 may determine whether the ratio of the charging amount of the external device 300 to the transmitted power amount is equal to or smaller than a predetermined ratio. For example, when the reference value is set such that the ratio of the charging power amount to the transmitted power amount is 50%, the controller 250 may determine whether the charging amount of the external device 300 is equal to or smaller than 50% of the transmitted power amount.

According to an embodiment of the present disclosure, when the charging amount becomes smaller compared to the transmitted power amount, the controller 250 may determine whether there is a hindrance between the electronic device 100 and the external device 300. According to an embodiment of the present disclosure, the controller 250 may photograph the front (for example, a direction of the external device 300 in front of the electronic device 100) of the electronic device 100 by controlling the camera unit 280. The controller 250 may determine whether there is a hindrance (for example, a particular object or human body) by analyzing an image generated by a photograph taken by the camera unit 280.

According to an embodiment of the present disclosure, when the hindrance is detected, the controller 250 may output a warning by controlling the display unit 210 or the audio unit 240.

According to various embodiments of the present disclosure, it is possible to detect a hindrance, which disturbs a charging path during the wireless charging to provide more efficient wireless charging.

The controller 250 may control a tunable circuit within the power supply unit. For example, the controller 250 may control a resonant circuit or a matching circuit within the power transmitter 270. For example, the controller 250 may adjust a value of a particular tunable device included in the tunable circuit within the power transmitter 270. The controller 250 may control resonance of the electronic device 100 and the external device 300 by adjusting the value of the tunable device.

The communication unit 260 may establish a connection with the external device 300 (for example, the receiver device) through a network (for example, a mobile communication network (for example, long term evolution (LTE)), or a wireless or wired LAN) and perform data communication with the connected external device 300 under a control of the controller 250. The communication unit 260 may establish a direct connection with the external device 300 through a peer to peer connection scheme (for example, Wi-Fi direct, Bluetooth, or the like) without any relay of a medium (for example, an access point (AP)) and perform data communication with the connected external device 300. According to an embodiment of the present disclosure, the communication unit 260 may transmit a message or the like, which makes a request for authenticating the electronic device 300, to the external device 300 under a control of the controller 250.

The power transmitter 270 may wirelessly supply (e.g., transmit) power to the external device 300. For example, the power transmitter 270 may include a near field magnetic resonant (NFMR) charging module for supporting wireless charging.

The power transmitter 270 may convert a DC voltage on a predetermined level into an AC voltage to generate power. For example, the power transmitter 270 may convert the DC voltage to the AC voltage by using a reference resonant frequency. According to an embodiment, the power transmitter 270 may include at least one directional device to output electromagnetic energy having particular directivity. For example, the power transmitter 270 may include at least one directional filter or directional coupler. According to an embodiment of the present disclosure, the power transmitter 270 may include a transmission antenna 275 for transmitting power. The transmission antenna 275 may be a directional antenna.

According to an embodiment of the present disclosure, the power transmitter 270 may include a matching circuit or a resonant circuit including a directional device. The matching circuit and the resonant circuit may include at least one tunable device. For example, the matching circuit or the resonant circuit may include at least one of a tunable capacitor, a tunable inductor, and a tunable resistor. The power transmitter 270 may match impedances of the electronic device 100 and the external device 300 by tuning at least one value of the tunable device of the matching circuit under a control of the controller 250. The power transmitter 270 may form resonance of the electronic device 100 and the external device 300 by tuning at least one value of the tunable device of the resonant circuit under a control of the controller 250. For example, the power transmitter 270 may adjust the resonant circuit to make frequencies of circuits of the electronic device 100 and the external device 300 become the resonant frequency. The power transmitter 270 may control the resonant circuit to resonate with the external device 300 by tuning at least one value of the tunable device of the matching circuit.

According to an embodiment of the present disclosure, the power transmitter 270 may control a Q factor of an internal circuit to increase an efficiency of transmitted power and match the resonant frequency of the external device 300. According to an embodiment, the power transmitter 270 may remove a predetermined void within a virtual charging area (for example, a predetermined area in a direction of the external device 300) by correcting resonant characteristics such as the frequency.

According to various embodiments of the present disclosure, when the electronic device 100 provides wireless charging to a plurality of external devices 300, the power transmitter 270 may control the resonant frequency in consideration of circuit characteristics of the plurality of detected external devices 300. For example, the power transmitter 270 may control the resonant characteristics of the circuits by considering the electronic device 100 and at least one external device 300 as one resonant circuit.

According to various embodiments of the present disclosure, when the power transmitter 270 provides wireless charging to the plurality of external devices 300, the power transmitter may transfer power to a first external device having a priority and transfer extra energy (i.e., power) to a second external device by using an antenna of the first external device.

According to an embodiment of the present disclosure, the power transmitter 270 may generate power, control the matching circuit to match the impedances of the electronic device 100 and the external device 300, generate electromagnetic energy corresponding to the generated power, and transmit the generated electromagnetic energy to the external device 300.

According to an embodiment of the present disclosure, the power transmitter 270 may output the electromagnetic energy in a particular direction determined by the controller 250 under a control of the controller 250. For example, the power transmitter 270 may output the electromagnetic energy in a particular direction of the external device 300 under a control of the controller 250. For example, the power transmitter 270 may make a control to output the electromagnetic energy only in a particular direction by using internal directional components (for example, a directional filter, a directional coupler, a directional antenna, or the like).

According to various embodiments of the present disclosure, the power transmitter 270 may be a separate external device. The power transmitter 270 may be a device which is connected through an interface (for example, a USB or a cable) such as a dongle to improve a performance of a legacy device. That is, the power transmitter 270 may be a separate device which is connected to the electronic device 100 to provide a wireless charging function. According to an embodiment of the present disclosure, the power transmitter 270 may be a separate device constituting the housing of the electronic device 100 or a part of the housing. According to various embodiments of the present disclosure, the power transmitter 270 itself may be implemented as a separate independent device for providing wireless charging. In this case, the power transmitter 270 may include a separate processor for controlling the operation of the power transmitter 270 instead of the controller 250. When the power transmitter 270 is implemented as the independent device, the power transmitter 270 may further include one or more modules for performing at least some functions of the display unit 210, the audio unit 240, the communication unit 260, the camera unit 280, and the sensor unit 290.

The camera unit 280 may photograph a still image or a dynamic image in front of the source device 100 and transfer the photographed image to the controller 250. According to an embodiment of the present disclosure, the camera unit 280 may include one or more image sensors, a lens, an image signal processor (ISP), and a flash (for example, LED or xenon lamp). The camera unit 280 may photograph a subject in front of the source device 100 during wireless charging under a control of the controller 250. The camera unit 280 may transfer an image generated by photographing the subject to the controller 250.

The sensor unit 290 may measure a physical quantity or detect an operating state of the electronic device 100, and convert the measured or detected information into an electrical signal. The sensor unit 290 may include at least one of, for example, a gesture sensor, a gyro sensor, an atmospheric pressure sensor, a magnetic sensor, an acceleration sensor, a grip sensor, a proximity sensor, a color sensor (for example, a red, green, and blue (RGB) sensor), a biometric sensor, a temperature/humidity sensor, an illumination sensor, and an ultraviolet (UV) sensor. Additionally or alternatively, the sensor unit 290 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor unit 290 may further include a control circuit for controlling at least one sensor included therein. According to an embodiment of the present disclosure, the sensor unit 290 may be activated under a control of the controller 250 to detect whether there is a hindrance in front of the source device 100 (for example, the external device 300 (receiver device)).

Figure 3:
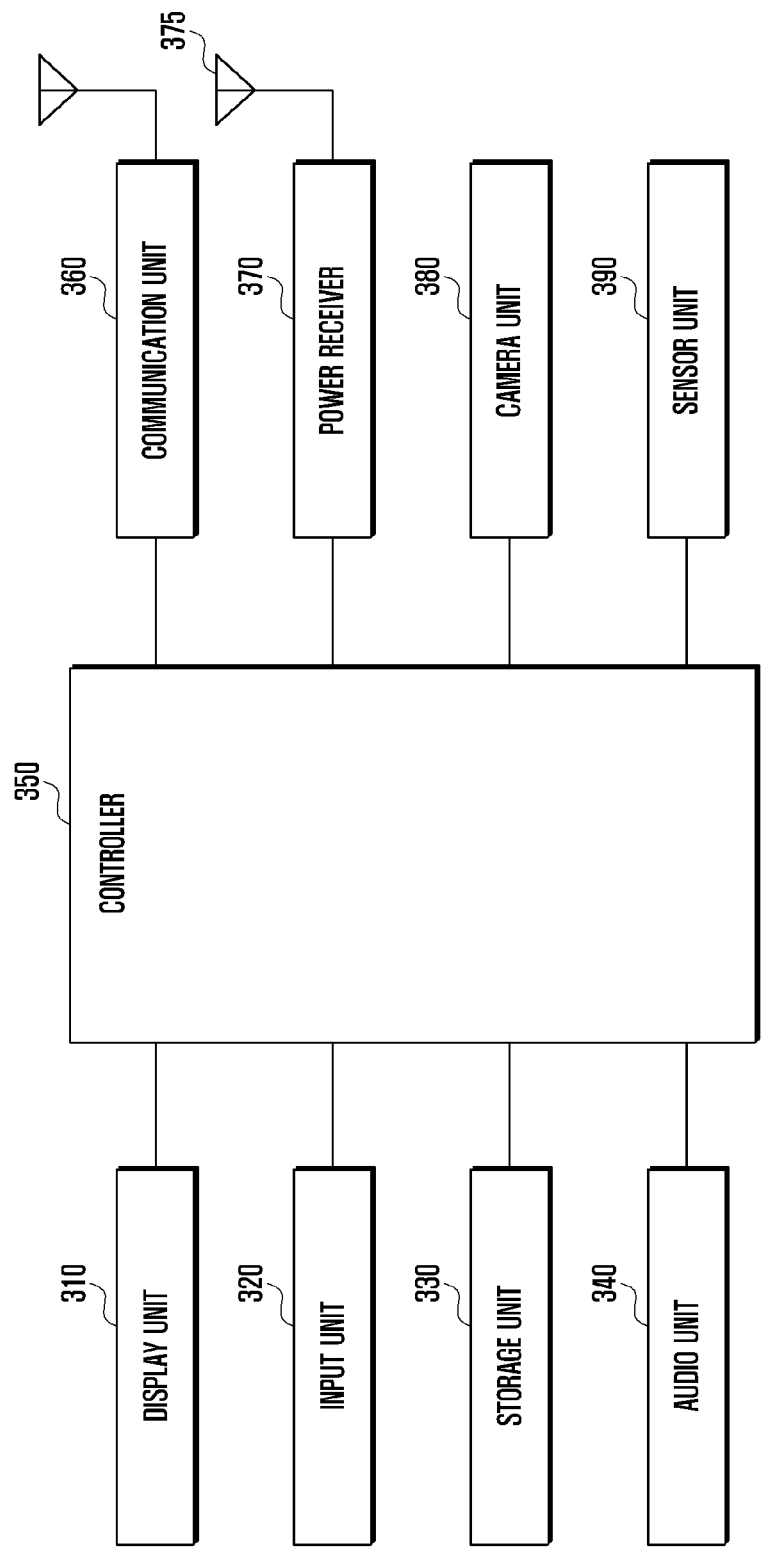
FIG. 3 is a block diagram illustrating an electronic device according to various embodiments of the present disclosure.

FIG. 3 is a block diagram of an electronic device according to various embodiments of the present disclosure.

Referring to FIG. 3, the receiver device 300 may include a display unit 310, an input unit 320, a storage unit 330, an audio unit 340, a controller 350, a communication unit 360, a power receiver 370, a camera unit 380, and a sensor unit 390.

The display unit 310 may include a panel, a hologram device, or a projector. The panel may be implemented to be, for example, flexible, transparent, or wearable. The panel and the touch panel may be implemented together as one module. The hologram device may show a three-dimensional image in the air using interference of light. The projector may display an image by projecting light onto a screen. The screen may be located, for example, inside or outside of the receiver device 300. According to an embodiment of the present disclosure, the display unit 310 may further include a control circuit for controlling the panel, the hologram device, or the projector.

The input unit 320 may include, for example, a touch panel, a (digital) pen sensor, a key, or an ultrasonic input device. The touch panel may use, for example, at least one of a capacitive type, a resistive type, an infrared type, and an ultrasonic type. Also, the touch panel may further include a control circuit. The touch panel may further include a tactile layer to provide a tactile reaction to the user.

The (digital) pen sensor may include, for example, a recognition sheet which is a part of the touch panel or is separated from the touch panel. The key may include, for example, a physical button, an optical key, or a keypad. The ultrasonic input device may detect an ultrasonic wave generated by an input tool through a microphone and determine data corresponding to the detected ultrasonic wave.

The storage unit 330 may include, for example, an internal memory or an external memory. The internal memory may include at least one of, for example, a volatile memory (for example, a dynamic random access memory (DRAM), a static RAM (SRAM), a synchronous dynamic RAM (SDRAM), and the like) and a non-volatile memory (for example, a one time programmable read only memory (OTPROM), a programmable ROM (PROM), an erasable and programmable ROM (EPROM), an electrically erasable and programmable ROM (EEPROM), a mask ROM, a flash ROM, a flash memory (for example, a NAND flash memory or a NOR flash memory), a hard drive, or a solid state drive (SSD).

The external memory may further include a flash drive, for example, a compact flash (CF), a secure digital (SD), a micro secure digital (Micro-SD), a mini secure digital (Mini-SD), an eXtreme digital (xD), a multi-media card (MMC), a memory stick, or the like. The external memory may be functionally and/or physically connected to the electronic device through various interfaces.

The audio unit 340 may bilaterally convert a sound and an electrical signal. The audio unit 340 may include, for example, a speaker, a receiver, earphones, or a microphone. The audio unit 340 may process sound information input or output through the speaker, the receiver, the earphones, or the microphone.

The controller 350 may control a plurality of hardware or software elements connected to the controller 350 by running an OS or an application program, and may process various types of data and arithmetic operations. The controller 350 may be implemented by, for example, a system on chip (SoC). According to an embodiment, the controller 350 may further include a graphic processing unit (GPU) and/or an image signal processor. The controller 350 may load, into a volatile memory, instructions or data received from at least one (for example, a non-volatile memory) of the other elements and may process the loaded instructions or data, and may store various data in a non-volatile memory.

According to an embodiment of the present disclosure, the controller 350 may determine an operation mode of the electronic device before wireless charging starts. For example, the controller 350 may determine an operation mode when wireless power is received from an external electronic device. According to an embodiment of the present disclosure, when the operation mode of the electronic device is a vibration mode, the controller 350 may change the mode to a ringing mode. For example, when the wireless charging is performed while the electronic device is in the vibration mode, the vibration of the electronic device may influence a surrounding field (for example, electromagnetic field). Further, the vibration of the electronic device may influence resonance (for example, resonant frequency) between the electronic device and the external electronic device (source device 100). Accordingly, when the wireless charging is performed in the vibration mode, the wireless charging may not be smoothly performed or a charging efficiency may deteriorate.

According to an embodiment of the present disclosure, the controller 350 may automatically switch the operation mode of the electronic device to the ringing mode (or a silent mode) during the wireless charging. When the wireless charging is terminated (for example, when the charging is completed), the controller 350 may switch the operation mode of the electronic device to the mode which had been set before the wireless charging.

According to an embodiment of the present disclosure, the controller 350 may detect an incoming call during the wireless charging. When the call is received during the wireless charging, the controller 350 may determine a call connection. For example, the controller 350 may determine that the received call is connected according to a user input. That is, the controller 350 may detect that the user uses the electronic device for the phone call. When the call is connected, the controller 350 may transmit a call connection notification to the external electronic device (for example, the source device 100) to pause the wireless charging. For example, the controller 350 may make a request for pausing the wireless charging by transmitting the call connection notification to the external electronic device. When the call is terminated, the controller 350 may make a request for re-starting the wireless charging by transmitting a call termination notification to the external electronic device. For example, according to various embodiments of the present disclosure, when the electronic device is making a call connection (when the user is using the electronic device), the controller 350 may pause the wireless charging to reduce the heat generation of the electronic device and guarantee the safety of the user from an electromagnetic wave generated due to the wireless charging.

The communication unit 360 may include, for example, a cellular module, a Wi-Fi module, a Bluetooth module, a GNSS module (for example, a GPS module, a Glonass module, a Beidou module, or a Galileo module), an NFC module, and a radio frequency (RF) module.

The cellular module may provide a voice call, an image call, a text message service, or an Internet service through, for example, a communication network. According to an embodiment, the cellular module may distinguish and authenticate the receiver device 300 within a communication network by using a subscriber identification module (for example, a SIM card). According to an embodiment of the present disclosure, the cellular module may perform at least some of the functions which the processor 350 can provide. According to an embodiment, the cellular module may include a communication processor (CP).

Each of the Wi-Fi module, the Bluetooth module, the GNSS module, and the NFC module may include, for example, a processor for processing data transmitted/received through the corresponding module. According to some embodiments, at least a part (for example, two or more) of the cellular module, the Wi-Fi module, the Bluetooth module, the GNSS module, and the NFC module may be included in one integrated chip (IC) or in an IC package.

The RF module may transmit/receive, for example, a communication signal (for example, an RF signal). The RF module may include, for example, a transceiver, a power amplifier module (PAM), a frequency filter, a low noise amplifier (LNA), or an antenna. According to an embodiment of the present disclosure, at least one of the cellular module, the Wi-Fi module, the Bluetooth module, the GNSS module, and the NFC module may transmit/receive an RF signal through a separate RF module.

According to an embodiment of the present disclosure, the communication unit 360 may transmit a signal, which makes a request for wireless charging to the external electronic device (for example, the source device 100) under a control of the controller 350. The communication unit 360 may receive a signal, which makes a request for the authentication from the external electronic device. The communication unit 360 may transmit an authentication response signal including information for the authentication to the external electronic device under a control of the controller 350. When an incoming or outgoing phone call is connected during the wireless charging, the communication unit 360 may transmit a notification message informing of the phone call to the external electronic device (for example, the source device 100 which wirelessly supplies power) under a control of the controller 350. When the call is terminated, the communication unit 360 may transmit a notification message informing of call termination to the external electronic device.

The power receiver 370 may wirelessly receive power from the external electronic device (for example, the source device 100). For example, the power receiver 370 may receive electromagnetic energy from the external electronic device.

According to an embodiment of the present disclosure, the power receiver 370 may include a reception antenna 375 for receiving electromagnetic energy. According to an embodiment, the reception antenna 375 may be a directional antenna.

According to an embodiment of the present disclosure, the power receiver 370 may include a matching circuit or a resonant circuit which matches impedances with the external electronic device. The matching circuit or the resonant circuit may include at least one tunable device (for example, a tunable capacitor, a tunable inductor, a tunable resistor, or the like). The power receiver 370 may compensate for an impedance matching error by tuning an impedance value of the matching circuit. The power receiver 370 may form resonance between the electronic device and the external electronic device by controlling the device of the resonant circuit.

According to an embodiment of the present disclosure, the power receiver 370 may generate power by using the received electromagnetic energy. For example, the power receiver 370 may first generate an AC voltage by the received electromagnetic energy and rectify the generated AC voltage into a DC voltage. The power receiver 370 may generate a rated voltage by controlling a signal level of the rectified DC voltage. The power receiver 370 may charge the battery by using the generated rated voltage. According to various embodiments, the power receiver 370 may include a separate module or circuit including a receiver for converting the electromagnetic energy to generate the AC voltage, a rectifier for rectifying a voltage, and a charger for charging the battery with the rectified voltage. According to an embodiment, the power receiver 370 may control a Q factor of an internal circuit to increase an efficiency of received power and match the resonant frequency of the external electronic device.

According to an embodiment of the present disclosure, the power receiver 370 may further include a smoothing unit for smoothing the rectified voltage. According to an embodiment, the power receiver 370 may further include an over voltage protection circuit for reducing received power by de-tuning the resonant frequency of the resonant circuit to prevent the over voltage.

The camera unit 380 is a device which may photograph, for example, a still image and a dynamic image. According to an embodiment of the present disclosure, the camera unit 380 may include one or more image sensors (for example, a front sensor or a back sensor), a lens, an ISP or a flash (for example, LED or xenon lamp).

The sensor unit 390 may measure, for example, a physical quantity or detect an operating state of the receiver device 300, and convert the measured or detected information into an electrical signal. The sensor module may include at least one of, for example, a gesture sensor, a gyro sensor, an atmospheric pressure sensor, a magnetic sensor, an acceleration sensor, a grip sensor, a proximity sensor, a color sensor (for example, a RGB sensor), a biometric sensor, a temperature/humidity sensor, an illumination sensor, and a UV sensor. Additionally or alternatively, the sensor unit 390 may include, for example, an E-nose sensor, an EMG sensor, an EEG sensor, an ECG sensor, an IR sensor, an iris sensor, and/or a fingerprint sensor. The sensor unit 390 may further include a control circuit for controlling at least one sensor included therein. According to some embodiments, the receiver device 300 may further include a processor configured to control the sensor unit 390 as a part of or separately from the controller 350, and may control the sensor module 390 while the controller 350 is in a sleep state.

Figure 4A:
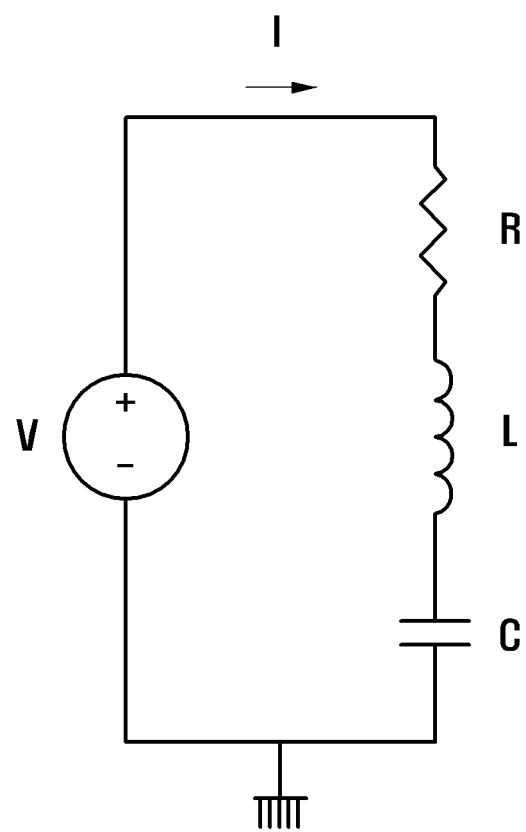
FIGS. 4A to 4C illustrate examples of a tunable circuit of an electronic device according to various embodiments of the present disclosure.
Figure 4B:
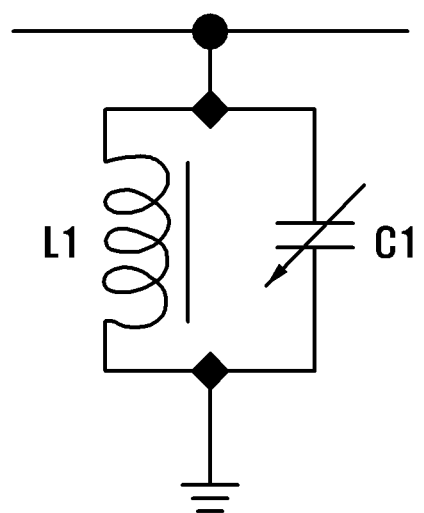
Figure 4C:
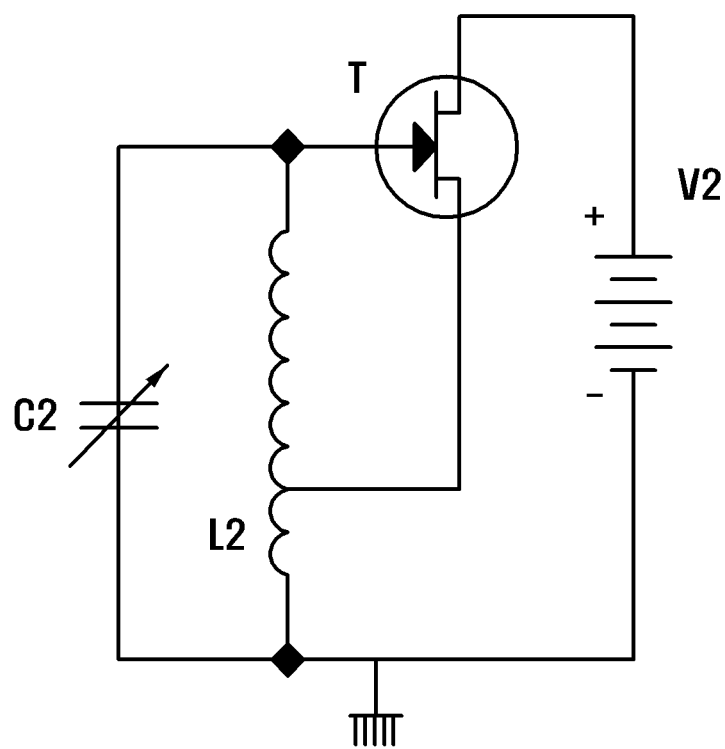

FIGS. 4A to 4C illustrate examples of a tunable circuit of the electronic device 100 according to various embodiments of the present disclosure.

Referring to FIGS. 4A to 4C, the electronic device 100 may tune a resonant frequency by changing a predetermined value of a tunable device within a tunable circuit. For example, when power of the same frequency as the resonant frequency of the circuit is transmitted in wireless charging, a Q factor may increase and a power transmission efficiency may increase. In the wireless charging, the resonant frequency may be changed according to a change in a correlation (for example, mutual inductance or mutual capacitance) between the electronic device 100 and the external device 300. The electronic device 100 may control the resonant frequency to have a desired value by changing the value of the device of the tunable circuit.

FIG. 4A illustrates a tunable circuit in which a resistor R, an inductor L, and a capacitor C are connected in series according to an embodiment of the present disclosure. For example, a current I may flow in the circuit in which the resistor R, the inductor L, and the capacitor C are connected to a voltage V in series. According to various embodiments, the at least one of the resistor R, the inductor L, and the capacitor C of the tunable circuit of the electronic device 100 may be a tunable device (for example, a tunable resistor, a tunable capacitor, and a tunable inductor) of which a device value is tunable. The electronic device 100 may control the resonant frequency by changing a value of at least one of the tunable devices within the tunable circuit.

FIG. 4B illustrates a tunable circuit including an inductor and a capacitor according to an embodiment of the present disclosure. For example, the tunable circuit may be a form in which an inductor L1 and a tunable capacitor C1 are connected in parallel. The electronic device 100 may control the resonant frequency of the electronic device 100 by adjusting a value of the tunable capacitor C1 within the tunable circuit.

FIG. 4C illustrates a tunable circuit according to an embodiment of the present disclosure. According to an embodiment of the present disclosure, the electronic device 100 may include a Hartley oscillator as a tunable circuit. The Hartley oscillator is an oscillator using a Hartley circuit. In the Hartley oscillator, the parallel resonant circuit (L2 and C2) is connected between a base and a collector of a transistor T and an inductance element L2 of the parallel resonant circuit (L2 and C2) has an intermediate tap, which may be maintained as an emitter potential of the transistor T. The Hartley oscillator corresponds to an oscillator having a structure in which a feedback voltage is provided from one end of the inductance device L2 to a base of the transistor T. The electronic device 100 may tune the resonant frequency by changing a value of the inductance device L2 or the tunable capacitor C2 of the Hartley oscillator.

According to various embodiments of the present disclosure, the tunable circuit of the electronic device 100 is not limited to the circuits illustrated in FIGS. 4A to 4C, and may have various modified forms. The electronic device 100 may tune the resonant frequency by controlling the tunable circuit and form a circuit having a high Q factor value.

Figure 5A:
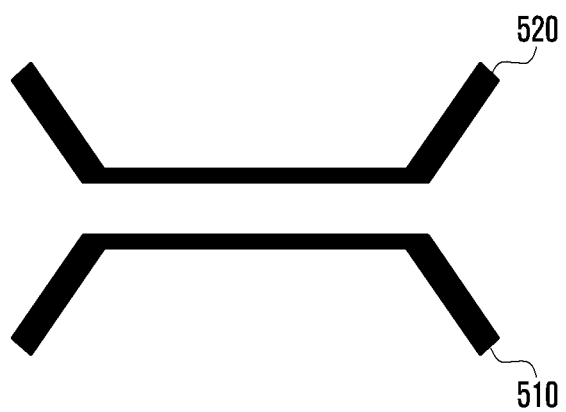
FIGS. 5A and 5B illustrate an example of a coupler of an electronic device according to various embodiments of the present disclosure.
Figure 5B:
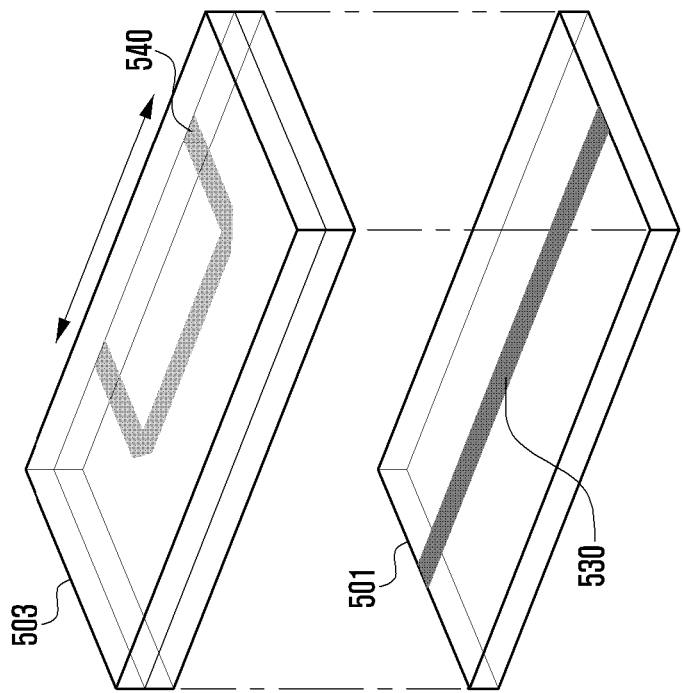
Figure 5B:
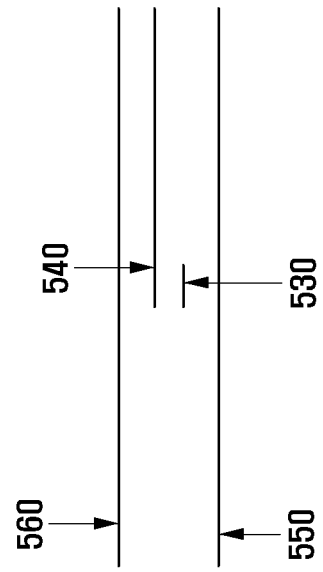

FIGS. 5A and 5B illustrate an example of a directional coupler of the electronic device according to various embodiments of the present disclosure.

Referring to FIGS. 5A and 5B, the directional coupler may be a microwave component which can be applied to wireless power transmission. The directional coupler may transfer a signal or a wave only in a particular direction.

FIG. 5A illustrates a schematic structure of a directional coupler used for the electronic device 100 according to an embodiment of the present disclosure.

Referring to FIG. 5A, the directional coupler may include two lines 510 and 520 in which currents flow. For example, the directional coupler may generate an electromagnetic field due to the currents flowing through the first line 510 or the second line 520 separated from the first line 510 at a predetermined interval. That is, when the current flows in at least one of the first line 510 and the second line 520, magnetic flux according to the current pours to another line and thus an electromotive force may be generated due to a mutual induction action. As the current flows in the first line 510 or the second line 520, an electrical connection, that is, coupling may be created between the first line 510 and the second line 520.

FIG. 5B illustrates an example of a directional coupler used for the electronic device 100 according to an embodiment of the present disclosure.

Referring to FIG. 5B, the directional coupler may include lines 530 and 540, in which the current flows, formed in units 501 and 503 to be spaced apart from each other (for example, devices or substrates formed separately from each other). For example, the directional coupler may include the first line 530 formed in the lower unit 501 as a power line and the second line 540 formed in the upper receiver unit 503 as a receiver line. The first line 530 is a linear line, and the second line is a line of which a part is in the same direction as that of the first line 530 and of which a part is bent in a direction orthogonal to the first line 530. The directional coupler may include grounds 550 and 560 which are formed under the first line 530 to be spaced apart from the first line 530 by a predetermined interval and formed above the second line 540 to be spaced apart from the second line 540 by a predetermined interval.

Figure 6A:
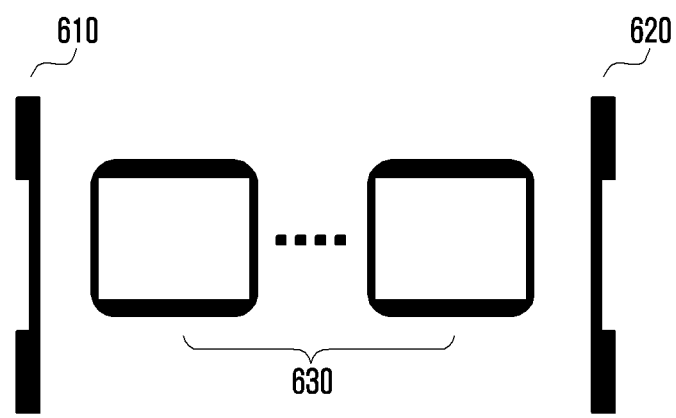
FIGS. 6A and 6B illustrate an example of a filter of an electronic device according to various embodiments of the present disclosure.
Figure 6B:
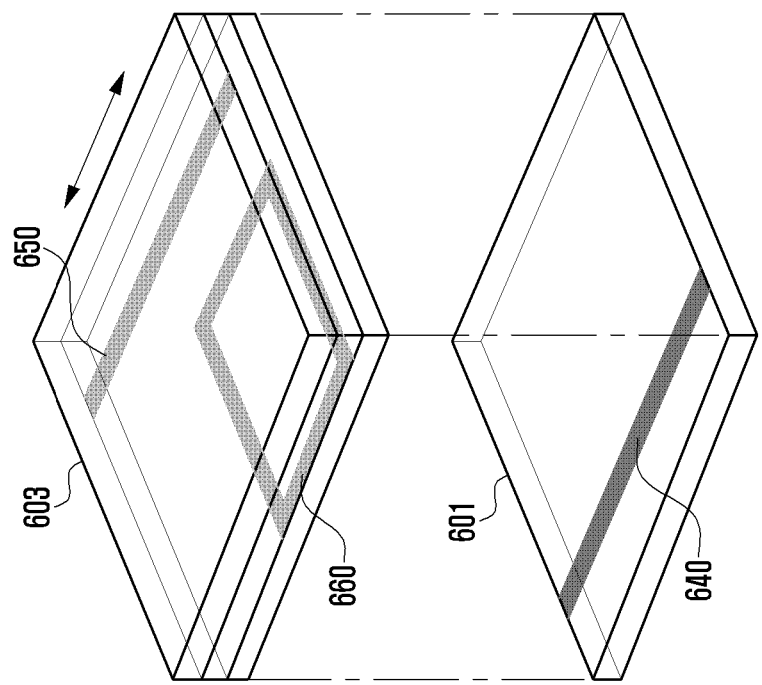
Figure 6B:
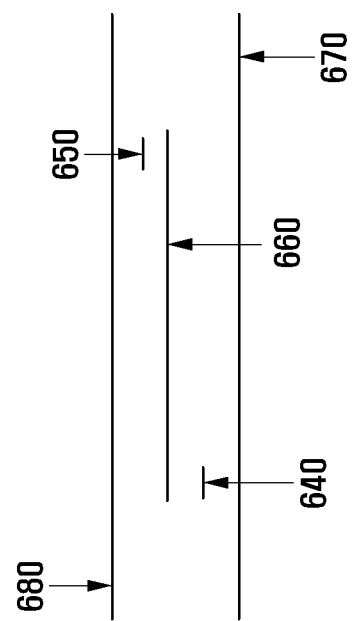

FIGS. 6A and 6B illustrate an example of a directional filter of an electronic according to various embodiments of the present disclosure.

Referring to FIGS. 6A and 6B, the directional filter may be a microwave component which can be applied to wireless power transmission.

FIG. 6A illustrates a schematic structure of a directional filter used for the electronic device 100 according to an embodiment of the present disclosure.

Referring to FIG. 6A, the directional filter may include two lines 610 and 620 in which the current flows and a resonator 630. For example, the directional filter may include the resonator 630 between the first line 610, in which the current can flow, and the second line 620 spaced apart from the first line 610 by a predetermined interval. Although FIG. 6A illustrate a ring resonator 630 as an example of the resonator, the type of resonator is not limited thereto. The directional filter may operate as a filter in one particular direction and may not act in other directions. For example, the directional filter may filter and transfer a signal or wave generated through the resonator 630 only in a particular direction.

FIG. 6B illustrates an example of a directional filter used for the electronic device 100 according to an embodiment of the present disclosure.

Referring to FIG. 6B, the directional filter may include lines 640 and 650, in which the current flows, formed in units 601 and 603 to be spaced apart from each other (for example, devices or substrates formed separately from each other). For example, the directional filter may include the first line 640 formed in the lower unit 601 as a power line, the second line 650 formed in the upper receiver unit 603 as a receiver line, and a resonator 660 formed in the upper unit 603. The first line 640 may be linearly formed along one surface of the resonator 660 on the lower unit 601. The second line 650 may be linearly formed along one surface of the resonator 660, which is opposite to the first line 640, while being formed above the resonator 660 to be spaced apart from the resonator 660 by a predetermined interval on the upper unit 603 such as the resonator 660. The directional filter may include grounds 670 and 680 which are formed above the second line 650 to be spaced apart from the second line 650 by a predetermined interval and formed under the first line 640 to be spaced apart from the first line 640 by a predetermined interval.

Figure 7:
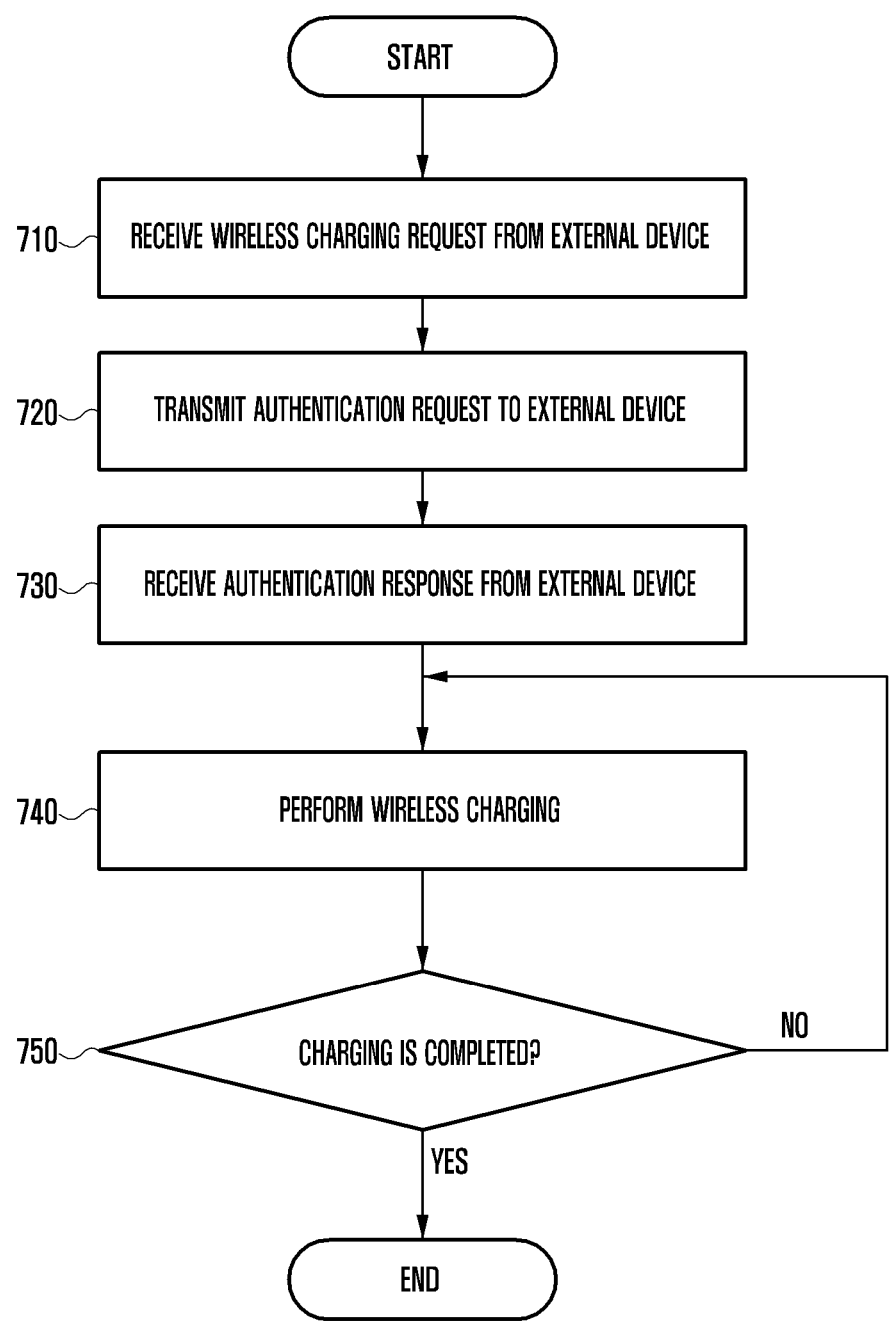
FIG. 7 is a flowchart illustrating a wireless charging method of an electronic device according to various embodiments of the present disclosure.

FIG. 7 is a flowchart illustrating a wireless charging method of an electronic device according to various embodiments of the present disclosure.

Referring to FIG. 7, the electronic device 100 may receive a wireless charging request from an external device, such as external device 300, in operation 710. For example, the electronic device 100 may receive a signal from the external device 300 through a particular communication protocol (for example, Wi-Fi, Bluetooth, or the like).

In operation 720, the electronic device 100 may transmit an authentication request signal to the external device 300. For example, the electronic device 100 may make a request for information on the external device 300 to determine whether the external device 300 is a device that is allowed to receive wireless charging from the electronic device 100.

In operation 730, the electronic device 100 may receive an authentication response signal from the external device 300. The electronic device 100 may determine whether the external device 300 is the device that is allowed to receive the wireless charging by analyzing the authentication response received from the external device 300.

When the authentication of the external device 300 is completed, the electronic device 100 may perform the wireless charging in operation 740. According to an embodiment, when the external device 300 fails in the authentication, the electronic device 100 may not perform the wireless charging.

The electronic device 100 may wirelessly transmit power to the external device. For example, the electronic device 100 may perform a near field magnetic resonant (NFMR) charging function. According to an embodiment, the electronic device 100 may convert a DC voltage on a predetermined level into an AC voltage to generate power. The electronic device 100 may convert the DC voltage into the AC voltage by using a reference resonant frequency. The electronic device 100 may match impedances of the electronic device 100 and the external device 300 by tuning a value of at least one of the tunable devices of the internal circuit. The electronic device 100 may control the resonant frequency by tuning a value of at least one of the tunable devices of the internal resonant circuit. The electronic device 100 may generate electromagnetic energy corresponding to the generated power and transmit the generated electromagnetic energy to the external device 300.

The electronic device 100 may determine whether the charging of the external device 300 is completed in operation 750. For example, the electronic device 100 may periodically receive information on a residual amount of the battery or a charging amount from the external device 300. When the charging is completed, the electronic device 100 may receive a signal informing of the completion of the charging from the external device 300 and thus determine that the charging of the external device 300 is completed. The electronic device 100 may determine whether the charging of the external device 300 is completed by using information received from the external device 300. When the charging of the external device 300 is not completed, the electronic device 100 may continue with the charging. When the charging is completed, the electronic device 100 may stop the charging.

Figure 8:
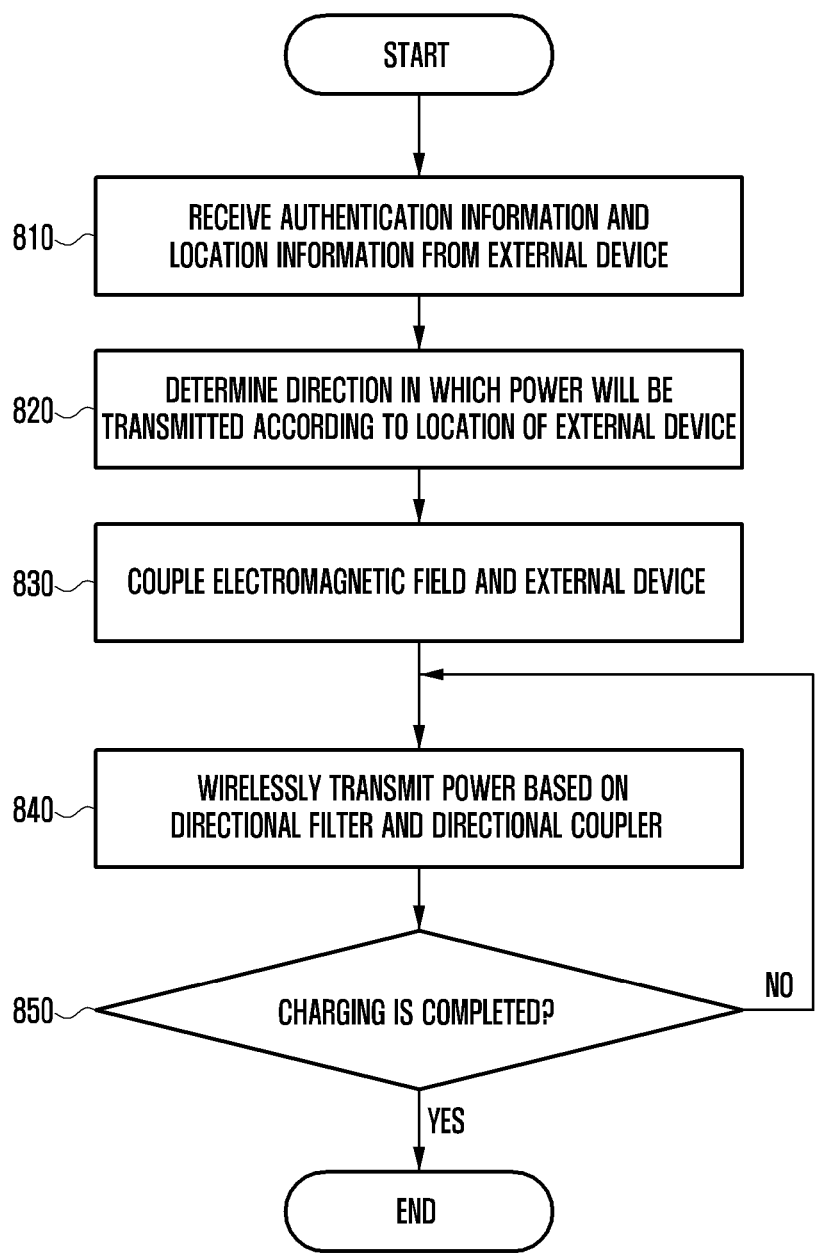
FIG. 8 is a flowchart illustrating a wireless charging method of an electronic device according to various embodiments of the present disclosure.

FIG. 8 is a flowchart illustrating a wireless charging method of an electronic device according to various embodiments of the present disclosure.

Referring to FIG. 8, the electronic device 100 may receive authentication information and location information from the external device 300 in operation 810. For example, the electronic device 100 may receive the authentication information and the location information from the external device 300, which has made a request for charging. The electronic device may evaluate the authentication information to determine whether the external device 300, which has made the request for charging, is a device having a right to receive wireless charging. The electronic device 100 may determine a location of the external device 300 by using the location information. According to an embodiment of the present disclosure, when the external device 300 having a frequency characteristic, which is properly controlled, approaches within a predetermined range, the electronic device 100 may detect the approaching external device 300 without receiving separate location information. For example, the external device 300, which has made the request for the wireless charging, may include a corresponding load (for example, a resonant circuit, which forms resonance between the electronic device 100 and the external device 300) which the electronic device 100 can detect. In this case, when the external device 300, which supports a wireless charging function, approaches, the electronic device may detect the approach.

In operation 820, the electronic device 100 may determine a direction in which electromagnetic energy is output within a near field of the electronic device 100 according to the location of the external device 300. For example, the electronic device 100 may output the electromagnetic energy to a predetermined area in a direction of the external device 300 in front of the electronic device 100.

In operation 830, the electronic device 100 may couple the electromagnetic field with the external device 300. For example, the electronic device 100 may be electrically coupled with the external device 300. For example, the electronic device 100 may couple the electromagnetic field with a reception antenna of the external device 300.

In operation 840, the electronic device 100 may transfer power to the external device 300 based on a directional filter or a directional coupler. For example, the electronic device 100 may transfer power to the external device 300 by outputting electromagnetic energy (for example, microwave or the like) to a predetermined area in a direction of the external device 300.

According to various embodiments of the present disclosure, the electronic device 100 may generate an area having directivity and output electromagnetic energy to the area, so as to support the wireless charging having a particular direction. The electronic device 100 may support wireless charging in a particular direction rather than wireless charging simply radiating power, and prevent transmission of power and outputting of electromagnetic waves in an unnecessary direction. That is, according to various embodiments of the present disclosure, the electronic device 100 may guarantee higher efficiency and safety in the wireless charging.

In operation 850, the electronic device 100 may determine whether the charging of the external device 300 is completed. When the charging of the external device 300 is not completed, the electronic device 100 may continue with the charging. When the charging is completed, the electronic device 100 may stop the charging.

Figure 9:
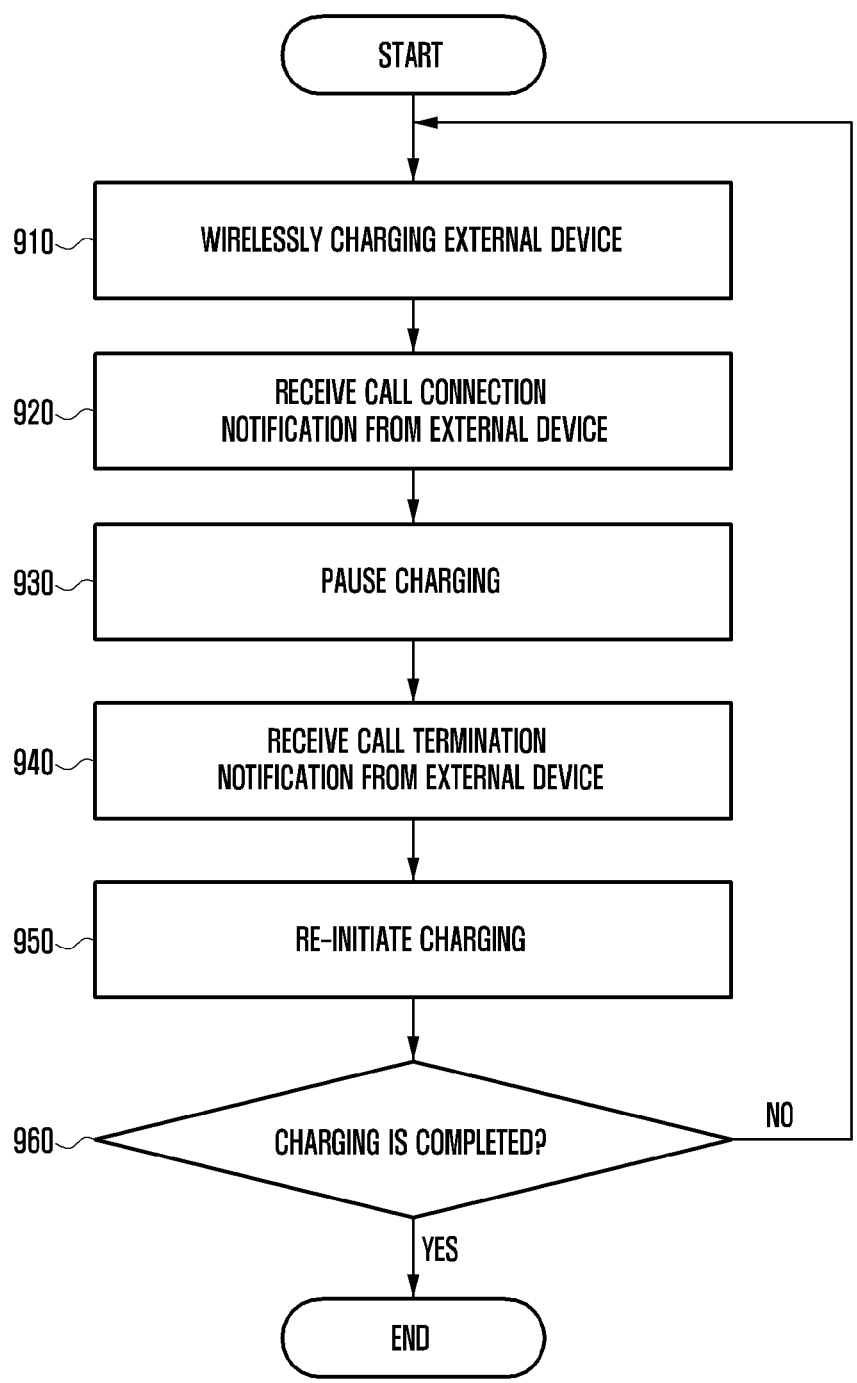
FIG. 9 is a flowchart illustrating a wireless charging method of an electronic device according to various embodiments of the present disclosure.

FIG. 9 is a flowchart illustrating a wireless charging method of an electronic device according to various embodiments of the present disclosure.

Referring to FIG. 9, the electronic device 100 may wirelessly charge the external device 300 in operation 910. For example, the electronic device 100 may receive a charging request from the external device 300 and perform an authentication of the external device 300 in response to the charging request. When the authentication of the external device 300 is successful, the electronic device 100 may perform the wireless charging.

In operation 920, the electronic device 100 may receive a call connection notification from the external device 300 during the wireless charging. For example, when the external device 300 receives or transmits a call and has a call connection, the electronic device 100 may receive a signal informing of the call.

In operation 930, the electronic device 100 may pause the wireless charging in response to the call connection notification. For example, the electronic device 100 may prevent the external device 300 from generating excessive heat due to the wireless charging during the call and guarantee the safety of the user of the external device 300 from the electromagnetic waves generated during the wireless charging.

In operation 940, the electronic device 100 may receive a call termination notification from the external device. For example, when the call of the external device is terminated, the electronic device 100 may receive a signal informing of the call termination from the external device 300.

In operation 950, the electronic device 100 may perform the wireless charging again.

In operation 960, the electronic device 100 may determine whether the charging of the external device 300 is completed. When the charging of the external device 300 is not completed, the electronic device 100 may continue with the charging. When the charging is completed, the electronic device 100 may stop the charging.

Figure 10:
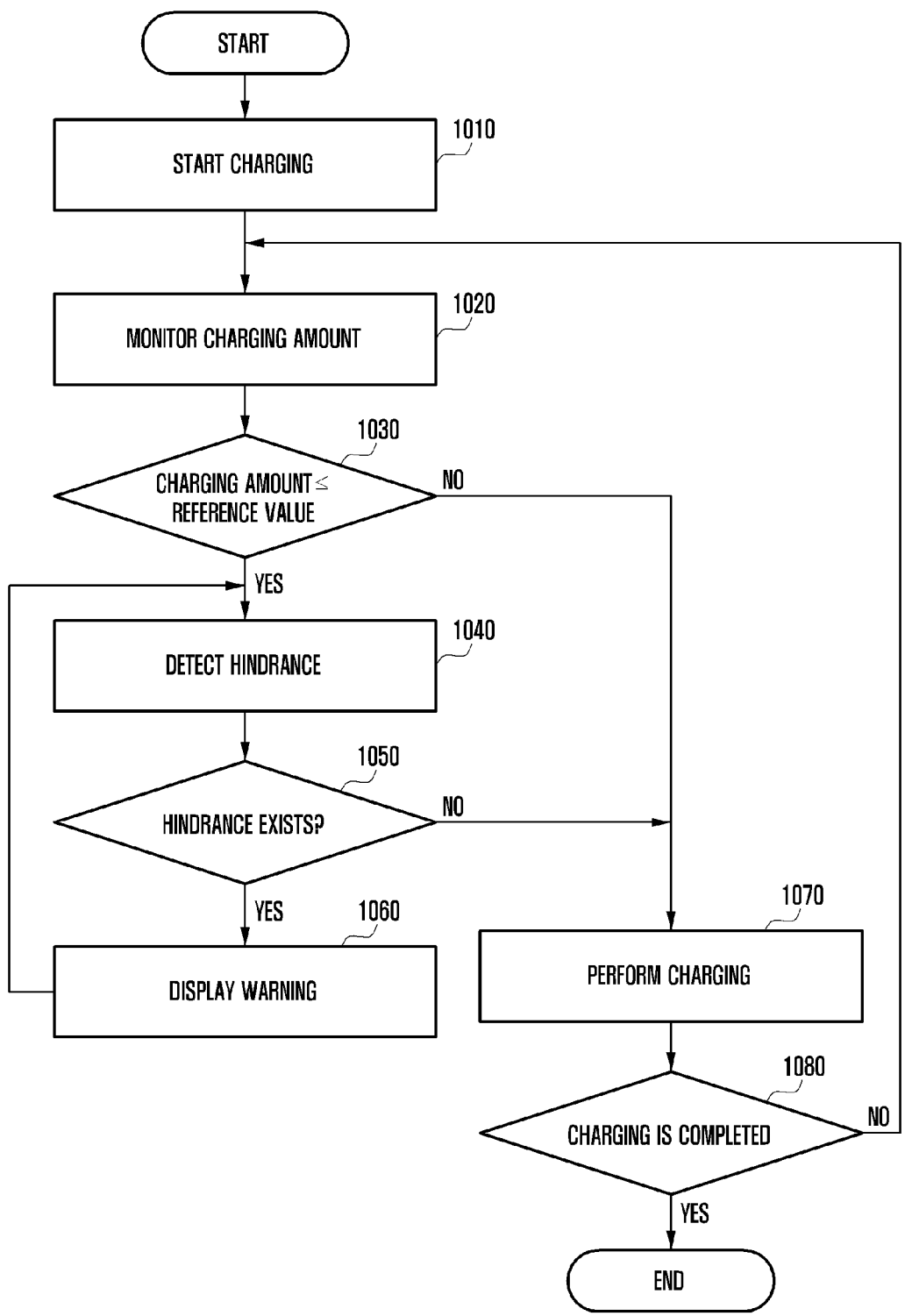
FIG. 10 is a flowchart illustrating a wireless charging method of an electronic device according to various embodiments of the present disclosure.

FIG. 10 is a flowchart illustrating a wireless charging method of an electronic device according to various embodiments of the present disclosure.

Referring to FIG. 10, the electronic device 100 may start the wireless charging in operation 1010. For example, the electronic device 100 may perform an authentication of the external device 300, which has made a request for the charging, and, when the authentication is successful, perform the wireless charging.

In operation 1020, the electronic device 100 may monitor a charging amount of the external device 300. For example, the electronic device 100 may periodically receive information on a residual amount of the battery or a charging amount of the external device 300 from the external device 300.

In operation 1030, the electronic device 100 may compare the charging amount of the external device 300 with a reference value, which may be preset. For example, the reference value may be a particular charging power or voltage value. The reference value may be a particular charging change amount. The reference value may be a particular ratio value of the charging amount of the external device 300 to a transmitted power amount. For example, the electronic device 100 may determine whether the ratio of the charging amount of the external device 300 to the transmitted power amount is equal to or smaller than a predetermined ratio. For example, when the reference value is set such that the ratio of the charging power amount to the transmitted power amount is 60%, the electronic device 100 may determine whether the charging amount of the external device 300 is equal to or smaller than 60% of the transmitted power amount. When the charging amount is equal to or smaller than the reference value, the electronic device 100 may perform operation 1040. When the charging amount is larger than the reference value, the electronic device 100 may continue with the charging operation in operation 1070.

In operation 1040, the electronic device 100 may determine that there is a hindrance. For example, in the wireless charging, when there is a predetermined hindrance or a person between the electronic device 100, which supplies power, and the external device 300, which receives power, the charging efficiency may rapidly deteriorate. Further, when there is a person between the electronic device 100 and the external device 300, electromagnetic waves generated during the wireless charging may affect the human body.

When a charging amount of the external device 300 is equal to or smaller than a reference value or when the charging amount of the external device 300 is rapidly changed, the electronic device 100 may determine whether there is a hindrance between the electronic device 100 and the external device 300.

For example, the electronic device 100 may photograph the front of the electronic device 100, that is, in a direction of the external device in front of the electronic device 100 by using a camera. For example, the electronic device 100 may photograph a subject in a direction in which electromagnetic energy is output. The electronic device 100 may determine whether there is a predetermined hindrance in a power transmission path (between the electronic device 100 and the external device 300) by analyzing an image generated by photographing the subject. According to an embodiment, the electronic device 100 may determine whether there is a predetermined hindrance between the electronic device 100 and the external device 300 by using a separate sensor (for example, an infrared sensor, an ultrasonic sensor, or the like) in addition to the camera.

When it is identified that there is the hindrance in operation 1050, the electronic device 100 may perform operation 1060. When it is identified that there is no hindrance in operation 1050, the electronic device 100 may perform operation 1070.

In operation 1060, the electronic device 100 may output a warning for informing the user that there is the hindrance. For example, the electronic device 100 may output a warning message on the screen of the display unit. The electronic device 100 may output a warning voice or a warning sound through the speaker of the audio unit. The electronic device 100 may continuously determine whether the hindrance is removed after the warning is output. When the hindrance is removed, the electronic device 100 may continue with the charging in operation 1070.

The electronic device 100 may determine whether the charging of the external device 300 is completed in operation 1080 and, when the charging is completed, terminate the wireless charging.

Figure 11:
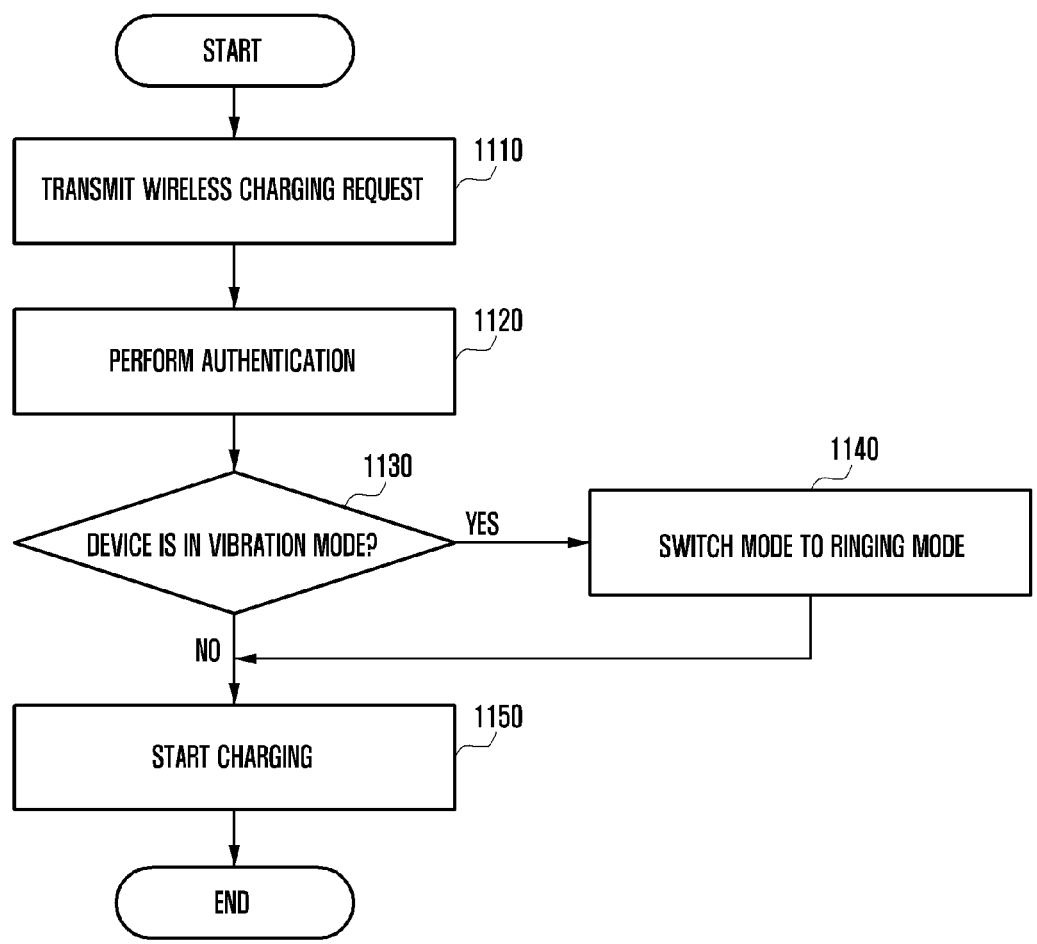
FIG. 11 is a flowchart illustrating a wireless charging method of an electronic device according to various embodiments of the present disclosure.

FIG. 11 is a flowchart illustrating a wireless charging method of an electronic device according to various embodiments of the present disclosure.

Referring to FIG. 11, the electronic device 300 may make a request for wireless charging to the external electronic device (for example, the source device) 100 in operation 1110. For example, the electronic device 300 may transmit a signal making a request for charging to the external electronic device 100 through a predetermined communication protocol (for example, Wi-Fi, Bluetooth, or the like).

In operation 1120, the electronic device 300 may perform an authentication with the external electronic device 100. For example, the electronic device 300 may receive an authentication request from the external electronic device 300. The electronic device 300 may transmit an authentication response to the external electronic device 100 in response to the authentication request. The authentication response may include device information and authentication (right) information on the electronic device 300. According to an embodiment of the present disclosure, the electronic device 300 may also transmit location information on the electronic device 300 together with the authentication response.

In operation 1130, the electronic device 300 may determine an operation mode before starting the wireless charging after the authentication is performed. For example, the electronic device 300 may determine whether a current operation mode is a vibration mode or a ringing mode (or a silent mode). The electronic device 300 may perform operation 1140 when the operation mode is the vibration mode, and perform operation 1150 when the operation mode is not the vibration mode.

In operation 1140, the electronic device 300 may change the operation mode to the ringing mode. For example, the electronic device 300 may switch the operation mode to the ringing mode or the silent mode while the wireless charging is performed and prevent the vibration of the electronic device 300 from influencing the wireless charging. That is, the electronic device 300 may prevent the charging efficiency from being deteriorated by making the vibration not influence the resonant frequency or the surrounding field during the wireless charging.

In operation 1150, the electronic device 300 may perform the wireless charging. According to an embodiment of the present disclosure, when the charging is completed, the electronic device 300 may transmit a signal informing of the completion of the charging to the external electronic device 100. According to an embodiment of the present disclosure, the electronic device 300 may periodically transmit information on a residual amount of the battery or a charging amount to the external electronic device 100 during the wireless charging.

Figure 12:
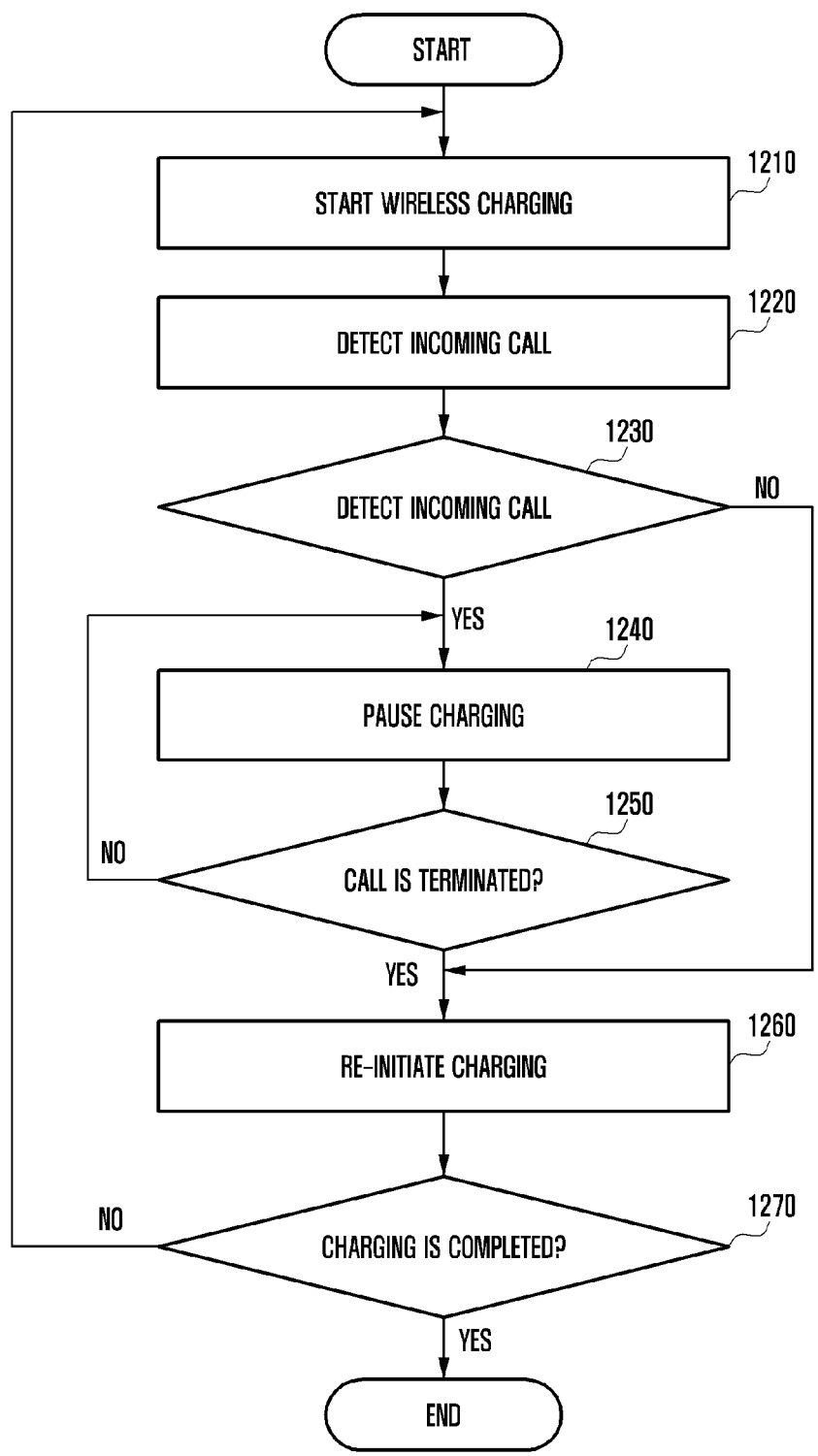
FIG. 12 is a flowchart illustrating a wireless charging method of an electronic device according to various embodiments of the present disclosure.

FIG. 12 is a flowchart illustrating a wireless charging method of an electronic device according to various embodiments of the present disclosure.

Referring to FIG. 12, the electronic device 300 may start the wireless charging in operation 1210. For example, the electronic device 300 may wirelessly receive power from the external electronic device 100.

In operation 1220, the electronic device 300 may detect an incoming call. In operation 1230, the electronic device 300 may determine whether the incoming call is connected. For example, the electronic device 300 may receive an input for connecting a call from the user in response to the incoming call. The electronic device 300 may perform operation 1240 when the phone call is connected. The electronic device 300 may continuously perform the charging operation in operation 1260 when the phone call is not connected.

In operation 1240, the electronic device 300 may pause the charging. For example, the electronic device 300 may transmit a signal making a request for stopping the charging to the external electronic device 100, which is supplying power. The electronic device 300 may make a request for stopping the wireless charging during the call to prevent the electronic device 300 from generating excessive heat during the call, and prevent the body of the user, which uses the electronic device 300, from being exposed to electromagnetic waves generated according to the wireless charging function.

In operation 1250, the electronic device 300 may detect a termination of the call. The electronic device 300 may perform operation 1260 when the call is terminated. The electronic device 300 may maintain a paused state of the wireless charging until the call is terminated.

In operation 1260, the electronic device 300 may re-initiate the wireless charging. For example, the electronic device 300 may transmit a signal making a request for re-starting the wireless charging to the external electronic device 100. The electronic device 300 may re-start the wireless charging to wirelessly receive power from the external electronic device 100.

In operation 1270, the electronic device 300 may determine whether the charging is completed. For example, the electronic device 300 may convert electromagnetic energy wirelessly received from the external electronic device 100 to charge the battery. The electronic device 300 may determine whether the charging is completed by checking a residual amount of the battery. When the charging is not completed, the electronic device 300 may continue with the charging. When the charging is completed, the electronic device 300 may transmit a signal informing of the completion of the charging to the external electronic device 100.

It may be understood that embodiments of the present disclosure can be implemented in software, hardware, or a combination thereof. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the software may be stored in a machine (for example, a computer)-readable storage medium.

It will be appreciated that a method of performing effective and safe wireless charging and an electronic device using the same according to the present disclosure may be implemented by a computer or a portable terminal including a processor and a memory, in which the memory may be an example of a program including instructions for implementing the embodiments of the present disclosure or a machine-readable recording medium that is suitable for storing one or more programs. Accordingly, the present disclosure includes a program including a code for implementing the apparatus or method described in any of the appended claims of the specification and a machine (computer or the like) readable storage medium for storing the program. Further, the program may be electronically carried by any medium such as a communication signal transferred through a wired or wireless connection, and the present disclosure appropriately includes equivalents thereof. The method of wirelessly charging the portable terminal and the apparatus using the same may receive the program from a program providing apparatus connected wirelessly or through a wire and store the received program. Further, the user may selectively limit operations according to embodiments of the present disclosure within the user terminal or expand the operations to interworking with a server through a network.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a transceiver configured to transmit and receive data to and from a first external device;
   a power transmitter configured to wirelessly supply power to the first external device; and
   at least one processor configured to, when a wireless charging request is received from the first external device:
      determine a direction in which electromagnetic energy is to be output according to the location of the first external device,
      control the power transmitter to output the electromagnetic energy in the determined direction to wirelessly transmit the power to the first external device,
      monitor a charging amount of the first external device based on information of the charging amount of the first external device received from the first external device,
      when a ratio value of the charging amount of the first external device to a transmitting power amount of the electronic device is equal to or smaller than a reference value, determine whether there is a hindrance between the electronic device and the first external device using a camera of the electronic device, and
      in response to determining that the hindrance exists in a power transmission path between the electronic device and the first external device, control the power transmitter to stop transmitting power to the first external device,
   wherein the at least on processor is further configured to control the first external device to transmit extra power to a second external device by using an antenna of the first external device.

2. The electronic device of claim 1, wherein the at least one processor is further configured to pause wireless charging when a call connection notification is received from the first external device.

3. The electronic device of claim 2, wherein the at least one processor is further configured to re-initiate the wireless charging when a call termination notification is received from the first external device while the wireless charging is paused.

4. The electronic device of claim 1, wherein the power transmitter includes at least one of a directional filter, a directional coupler, or a directional antenna.

5. The electronic device of claim 1, wherein the at least one processor is further configured to tune a value of a device within a tunable circuit within the power transmitter to resonate with the first external device located in the determined direction.

6. The electronic device of claim 1, wherein the at least one processor is further configured to control the camera to capture an image in the determined direction to determine whether there is the hindrance between the electronic device and the first external device.

7. The electronic device of claim 1, wherein the at least one processor is further configured to control to output a warning to inform a user that the hindrance exists in response to determining that the hindrance exists in the power transmission path between the electronic device and the first external device.

8. The electronic device of claim 1, wherein the charging value includes a charging change amount based on the charging amount or a ratio of the charging amount of the first external device to the transmitted power amount to the first external device.

9. A method of performing wireless charging by an electronic device, the method comprising:
  receiving a wireless charging request from a first external device;
  determining a direction in which electromagnetic energy is to be output according to a location of the first external device;
  outputting the electromagnetic energy in the determined direction to wirelessly transmit power to the first external device;
  monitoring a charging amount of the first external device based on information of the charging amount of the first external device received from the first external device;
  when a ratio value of the charging amount of the first external device to a transmitting power amount of the electronic device is equal to or smaller than a reference value, determining whether a hindrance exists between the electronic device and the first external device using a camera of the electronic device; and
  in response to determining that the hindrance exists in a power transmission path between the electronic device and the first external device, stopping the transmission of power to the first external device,
  wherein the electronic device is configured to control the first external device to transmit extra power to a second external device by using an antenna of the first external device.

10. The method of claim 9, further comprising:
  receiving a call connection notification from the first external device during the wireless charging; and
  pausing the wireless charging in response to the call connection notification.

11. The method of claim 10, further comprising:
  receiving a call termination notification from the first external device while the wireless charging is paused; and
  re-initiating the wireless charging in response to the call termination notification.

12. The method of claim 9, wherein the supplying of the power to the first external device comprises tuning a value of a device within a tunable circuit within the electronic device to resonate with the first external device located in the determined direction.

13. The method of claim 9, wherein the determining of whether a hindrance exists between the electronic device and the first external device comprises controlling the camera to capture an image in the determined direction to determine whether there is the hindrance between the electronic device and the first external device.

14. The method of claim 9, further comprising:
  outputting a warning to inform a user that the hindrance exists in response to determining that the hindrance exists in the power transmission path between the electronic device and the first external device.

15. The method of claim 9, wherein the charging value includes a charging change amount based on the charging amount or a ratio of the charging amount of the first external device to the transmitted power amount to the first external device.

16. A computer program product comprising a non-transitory computer-readable storage medium having a computer-readable program stored therein, the computer-readable program, when executed on a computing device, cause the computing device to:
  receive a wireless charging request from a first external device;
  determine a direction in which electromagnetic energy is to be output according to a location of the first external device;
  output the electromagnetic energy in the determined direction to wirelessly transmit power to the first external device;
  monitor a charging amount of the first external device based on information of the charging amount of the first external device received from the first external device;
  when a ratio value of the charging amount of the first external device to a transmitting power amount of the electronic device is equal to or smaller than a reference value, determine whether a hindrance exists between the computing device and the first external device using a camera of the computing device; and
  in response to determining that the hindrance exists in a power transmission path between the computing device and the first external device, stop the transmission of power to the first external device,
  wherein the computer-readable program further causes the computing device to control the first external device to transmit extra power to a second external device by using an antenna of the first external device.

17. The computer program product of claim 16, wherein the computer-readable program further causes the computing device to:
  receive a call connection notification from the first external device during the wireless charging; and
  pause the wireless charging in response to the call connection notification.

18. The computer program product of claim 16, wherein the computer-readable program further causes the computing device to:
  receive a call termination notification from the first external device while the wireless charging is paused; and
  re-initiate the wireless charging in response to the call termination notification.

19. The computer program product of claim 16, wherein the computer-readable program further causes the computing device to:
  control the camera to capture an image in the determined direction to determine whether there is the hindrance between the computing device and the first external device.

20. The computer program product of claim 16, wherein the charging value includes a charging change amount based on the charging amount or a ratio of the charging amount of the first external device to the transmitted power amount to the first external device.

21. An electronic device comprising:
  a transceiver configured to transmit and receive data to and from a first external device;
  a power transmitter configured to wirelessly supply power to the first external device; and
  at least one processor configured to, when a wireless charging request is received from the first external device:
    determine a direction in which electromagnetic energy is to be output according to a location of the first external device,
    control the power transmitter to output the electromagnetic energy in the determined direction to wirelessly transmit the power to the first external device,
    monitor a charging amount of the first external device based on information of the charging amount of the first external device received from the first external device, when a ratio value of the charging amount of the first external device to a transmitting power amount of the electronic device is equal to or smaller than a reference value, determine whether there is a hindrance between the electronic device and the first external device using a camera of the electronic device, and in response to determining that the hindrance exists in a power transmission path between the electronic device and the first external device, control the power transmitter to stop transmitting power to the first external device, wherein the at least one processor is further configured to control the first external device to transmit extra power to a second external device by using an antenna of the first external device.

* * * * *